United States Patent [19]

Brown

[11] Patent Number: 5,181,734
[45] Date of Patent: Jan. 26, 1993

[54] ADJUSTABLE GRAVEL SHIELD FOR A TOWED BOAT

[76] Inventor: Terry L. Brown, P.O. Box 9833, Amarillo, Tex. 79105

[21] Appl. No.: 838,824

[22] Filed: Feb. 21, 1992

[51] Int. Cl.⁵ .......................................... B62D 25/16
[52] U.S. Cl. .............................. 280/414.1; 280/851; 293/117
[58] Field of Search ................. 280/414.1, 770, 851, 280/155; 293/117

[56] References Cited

U.S. PATENT DOCUMENTS

| | | | |
|---|---|---|---|
| 3,746,366 | 7/1973 | Bruce et al. | 280/851 |
| 4,138,130 | 2/1979 | Pickrell et al. | 280/851 |
| 4,706,991 | 11/1987 | Miller | 280/770 |
| 4,840,400 | 6/1989 | Greenleaf | 280/770 |
| 5,121,944 | 6/1992 | Haddox | 280/851 X |

*Primary Examiner*—Charles A. Marmor
*Assistant Examiner*—Joseph D. Pape
*Attorney, Agent, or Firm*—Norman B. Rainer

[57] ABSTRACT

A shield device for protecting the front lower portion of a boat or automobile which is trailered behind a towing vehicle via a tongue frame member is constructed of an elongated rigid bar whose extremities pendantly hold paired resilient shield members. A mounting bracket, configured to releasibly attach to the tongue frame member, contains an upwardly directed pivot post which penetrates the elongated bar at its midpoint, thereby permitting pivotal movement of the elongated bar in a horizontal path. Elastic tethers extend from each extremity of the bar to the corresponding extremity of the rear bumper of the towing vehicle. By virtue of such construction, the shield members stay directly behind the rear wheels of the towing vehicle, even on curved roads.

5 Claims, 2 Drawing Sheets

ADJUSTABLE GRAVEL SHIELD FOR A TOWED BOAT

BACKGROUND OF THE INVENTION

1. Field of the Invention

The present invention relates generally to a gravel shield for protecting the front lower portion of a boat or automobile which is trailered behind a towing vehicle via a tongue frame member.

2. Description of the Prior Art

One of the problems relating to the transportation of boats mounted upon wheeled trailer frames is that gravel, propelled rearwardly from the wheels of the towing vehicle, impacts upon the hull with damaging force. Numerous shield devices have earlier been disclosed for positioning upon a trailer frame or trailer hitch for intercepting gravel and other debris. Such devices, although somewhat effective on straight roads, are of diminished effectiveness on curved roads where the towing vehicle and trailer are not in straight alignment. Most earlier protective devices have also required extensive modifications of the trailer frame or hitch and are not easily interchangeable with other trailers and towing vehicles.

It is accordingly an object of the present invention to provide a protective device for mounting upon a trailer hitch to protect a trailered object from debris propelled by the rear wheels of a towing vehicle.

It is another object of this invention to provide a device as in the foregoing object which is automatically correctively positioned when the trailered object and towing vehicle are not in straight alignment.

It is a further object of the present invention to provide a device of the aforesaid nature which can be easily installed upon and removed from a trailer hitch without modification of the hitch.

It is yet another object of this invention to provide a device of the aforesaid nature of rugged, durable construction and amenable to low cost manufacture.

These objects and other objects and advantages of the invention will be apparent from the following description.

SUMMARY OF THE INVENTION

The above and other beneficial objects and advantages are accomplished in accordance with the present invention by a protective device for mounting to a trailer hitch disposed behind the rear bumper of a towing vehicle, said protective device comprising:

a) an elongated rigid support member having a midpoint and opposed lateral extremities equidistantly spaced from said midpoint, b) paired resilient shield members pendantly held by said support member adjacent said lateral extremities and equidistantly spaced from said midpoint, c) a mounting bracket configured to embrace a trailer hitch disposed in generally orthogonal relationship beneath said support member, said mounting bracket securing said support member in a manner permitting pivotal movement of said support member about its midpoint in a horizontal path above said trailer hitch, and d) paired elastic tethers configured to extend between said lateral extremities and the rear bumper of said towing vehicle.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
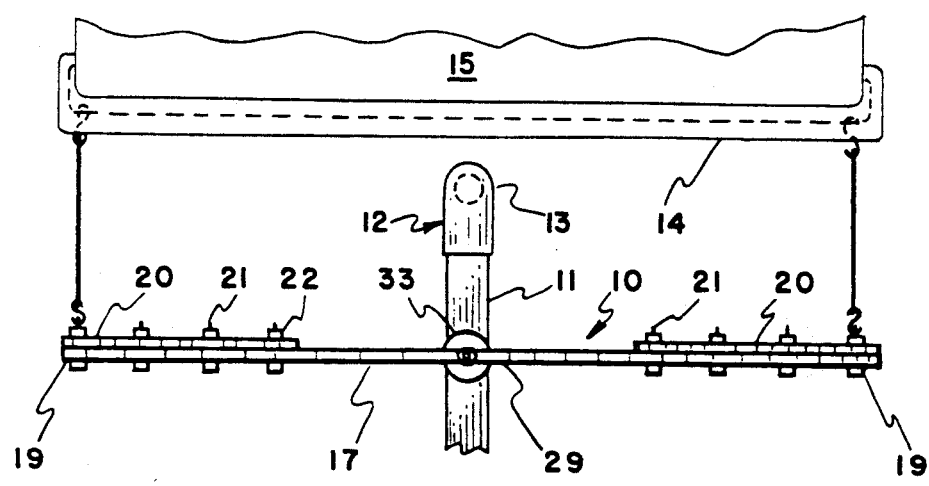
FIG. 1 is a top view of an embodiment of the protective device of the present invention shown in functional association with a trailer hitch and a towing vehicle.
Figure 2:
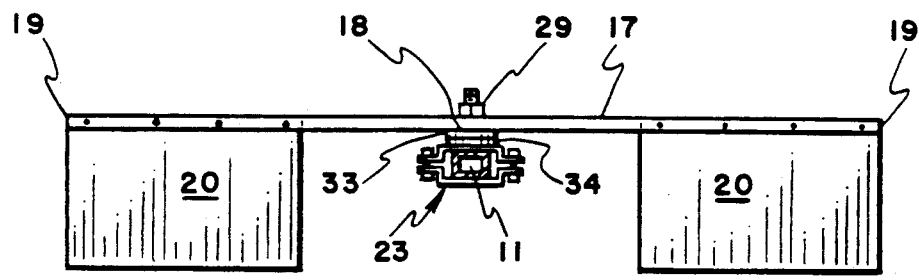
FIG. 2 is a front view of the embodiment of FIG. 1.
Figure 3:
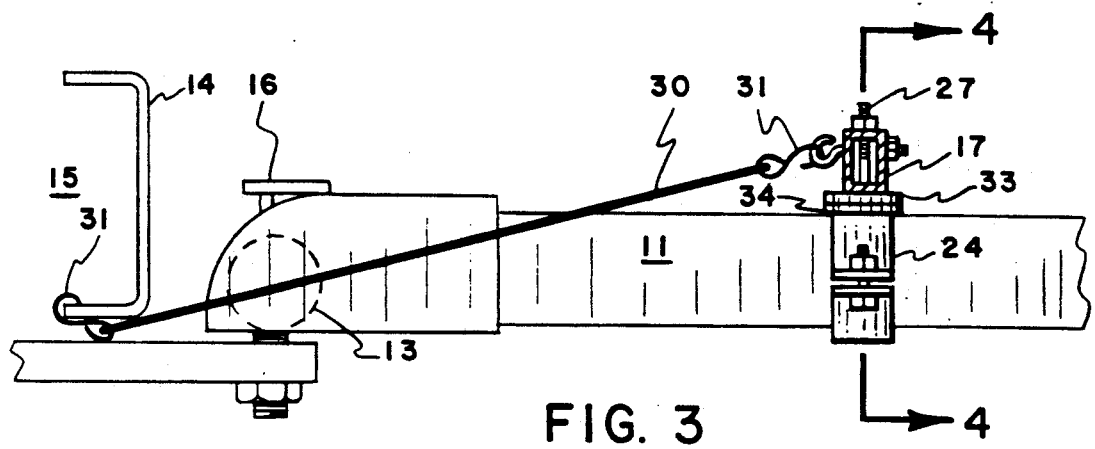
FIG. 3 is an enlarged side view shown in association with a trailer hitch and the rear bumper of a towing vehicle.
Figure 4:
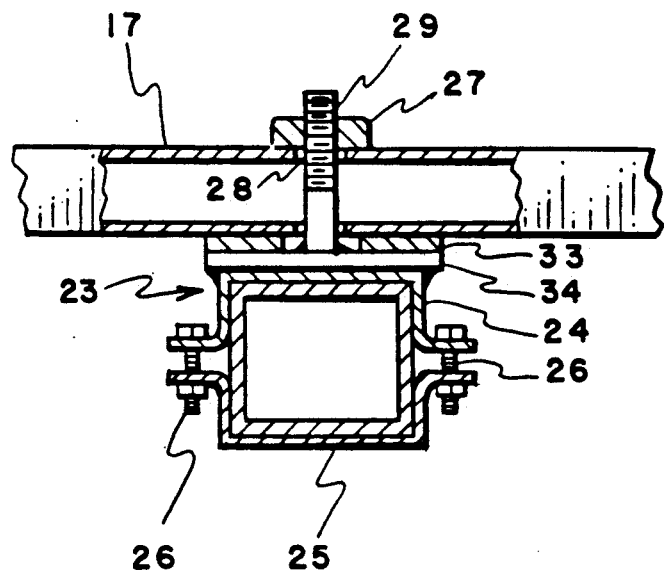
FIG. 4. is a sectional view taken in the direction of the arrows along line 4—4 of FIG. 3.

Referring to FIGS. 1-4, an embodiment of the protective device 10 of the present invention is shown mounted upon tongue beam 11 of trailer hitch 12 which is releasibly attached by ball connector 13 to towing vehicle 15 adjacent rear bumper 14 thereof. The unshown rearward extremity of beam 11 may join with a trailer adapted to carry a boat, or may connect to a towed vehicle. The trailer hitch is further comprised of locking means 16 positioned upon the forward extremity of tongue beam 11 for releasibly engaging ball connector 13. The illustrated tongue beam 11 has a rectangular cross-sectional configuration.

The protective device 10 of this invention is comprised of elongated rigid support member 17 having a midpoint 18 and opposed lateral extremities 19 equidistantly spaced from said midpoint. Support member 17 is adapted to be horizontally disposed above tongue beam 11 in substantially orthogonal juxtaposition therewith, and may be fabricated of tubular metal or solid metal rod stock.

Paired resilient shield members 20 are pendantly held by support member 17 adjacent said lateral extremities and equidistantly spaced from midpoint 18. The shield members may be fabricated of rubber or equivalent sheet material and are preferably of rectangular shape. In the exemplified embodiment, threaded posts 21 and locking nuts 22 are utilized to attach the shield members to support member 17. Alternative equivalent attaching means may be employed, preferably capable of facilitating replacement of worn shield members.

A mounting bracket 23, configured to embrace tongue beam 11, is comprised of upper and lower clamp members 24 and 25, respectively, and threaded locking bolts 26 adapted to urge said clamp members together against the intervening tongue beam 11. Pivot support means in the form of threaded vertical post 27 is fixedly associated with the upper surface of upper clamp member 24. In alternative equivalent embodiments, other means may be utilized to dispose post 27 upwardly from upper clamp member 24. Post 27 penetrates hole 28 centered on midpoint 18 of support member 17. Locking nut 29 secures support member 17 upon post 27. In such manner of construction, support member 17 is enabled to pivot about post 27 in a horizontal path. Various bearing means such as circular discs 33 and 34 may be interposed between the upper surface of clamp member 24 and the facing underside of support member 27.

Identically paired elastic tethers 30 extend between lateral extremities 19 of support member 17 and rear bumper 14. Said tethers may be constructed of monolithic pieces of elastomeric rubber, or may be comprised of a strand made of a multitude of rubber bands, as in bungee cords. In still other embodiments, the elastic tethers may be comprised of coil springs associated with a non-elastic tether cord. Tethers 30 are shown in the illustrated embodiment to engage both bumper 14 and support member 17 by S-hooks 31. Other equivalent tether attachment means may however, be employed.

By virtue of the aforesaid components and their interaction, shield members 20 are caused to be maintained in substantially constant position parallel to bumper 14 despite turning movements of the towing vehicle. Consequently, the boat or other towed item will be protected from road debris thrown by the tires of the vehicle even on a curved roadway.

Figure 5:
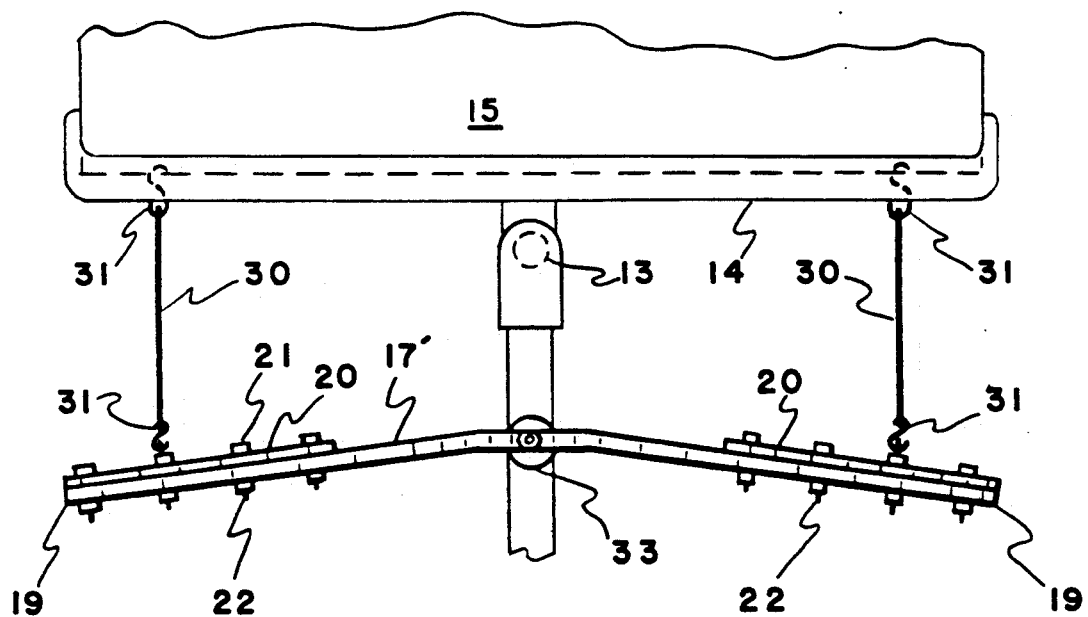
FIG. 5 is a top view of an alternative embodiment of the protective device of this invention.

The alternative embodiment illustrated in FIG. 5 utilizes a non-straight support member 17' which is nevertheless symmetrically shaped with respect to a vertical plane passing through midpoint 18.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A protective device for mounting to a trailer hitch disposed behind the rear bumper of a towing vehicle, said protective device comprising:
   a) an elongated rigid support member having a midpoint and opposed lateral extremities equidistantly spaced from said midpoint,
   b) paired resilient shield members pendantly held by said support member adjacent said lateral extremities and equidistantly spaced from said midpoint,
   c) a mounting bracket configured to embrace a trailer hitch disposed in generally orthogonal relationship beneath said support member, said mounting bracket securing said support member in a manner permitting pivotal movement of said support member about its midpoint in a horizontal path above said trailer hitch, and
   d) paired elastic tethers configured to extend between said lateral extremities and the rear bumper of said towing vehicle.

2. The device of claim 1 wherein bearing means to facilitate rotative movement of said support member are disposed between said support member and said bracket.

3. The device of claim 2 wherein said bearing means are a pair of slidably interengaging discs.

4. The device of claim 1 wherein said mounting bracket is comprised of upper and lower clamp members which are interengaged by threaded bolts.

5. The device of claim 4 wherein a pivot post extends vertically upward from said upper clamp member.

* * * * *